United States Patent [19]

Happer

[11] 4,286,630
[45] Sep. 1, 1981

[54] SURFACE DUCTING

[75] Inventor: George T. Happer, London, United Kingdom

[73] Assignee: Happer Systems Limited, London, England

[21] Appl. No.: 59,613

[22] Filed: Jul. 23, 1979

[30] Foreign Application Priority Data

Jul. 25, 1978 [GB] United Kingdom ............... 31017/78

[51] Int. Cl.³ .......................... H02G 3/04; H02G 3/28
[52] U.S. Cl. ..................................... 138/92; 138/116; 174/97; 174/101
[58] Field of Search ................. 138/92, 115, 116, 117, 138/157, 162; 174/48, 68 C, 97, 101

[56] References Cited

FOREIGN PATENT DOCUMENTS 2124163 11/1972 Fed. Rep. of Germany ........... 174/101
2129574 1/1973 Fed. Rep. of Germany ............ 174/97

Primary Examiner—Frederick R. Schmidt
Attorney, Agent, or Firm—Fleit & Jacobson

[57] ABSTRACT

Surface ducting comprising a body portion and a removeable lid, the body portion having a base, first longitudinal channels defined by longitudinally extending ribs which are upstanding from the base, and a pair of second longitudinal channels which are arranged one on each side of the first channels and which are each defined by a side wall of the body portion which is upstanding from the base and one of the ribs, the first and second longitudinal channels being of the same height, the first channels being for receiving elongate members, the second channels being narrower than the first channels and being for receiving fixing means, and the lid having integrally formed retainer means for clipping in the second channels.

10 Claims, 7 Drawing Figures

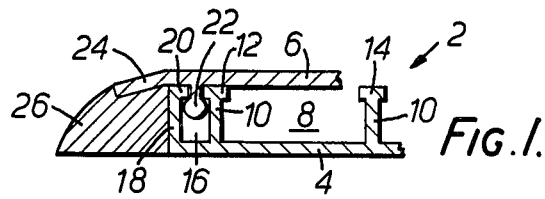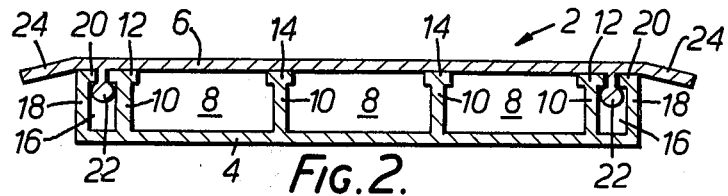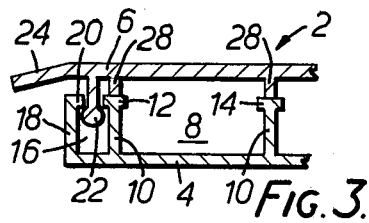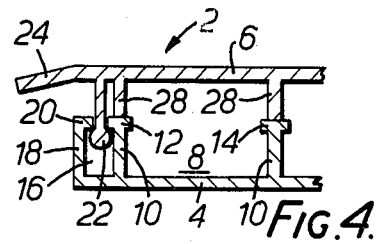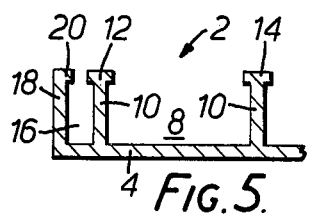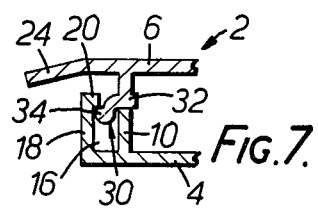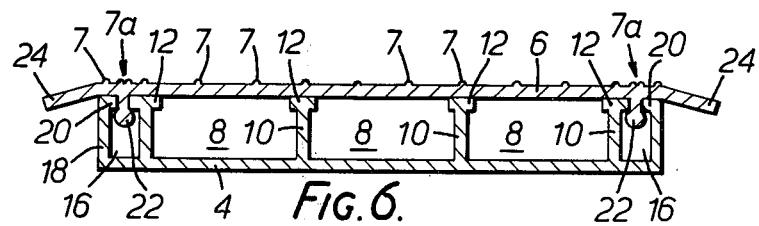

SURFACE DUCTING

This invention relates to surface ducting for enabling elongate members such for example as cables and pipes to be laid across the surface of a basic substrate material such for example as a floor, wall or ceiling.

Surface ducting already exists in many designs but for one reason or another it is not satisfactory. It is an aim of the present invention to provide new surface ducting which is not subject to the disadvantages of the known surface ducting.

Accordingly, this invention provides surface ducting comprising a body portion and a removable lid, the body portion having a base, first longitudinal channels defined by longitudinally extending ribs which are upstanding from the base, and a pair of second longitudinal channels which are arranged one on each side of the first channels and which are each defined by a side wall of the body portion which is upstanding from the base and one of the ribs, the first and second longitudinal channels being of the same height, the first channels being for receiving elongate members, the second channels being narrower than the first channels and being for receiving fixing means, and the lid having integrally formed retainer means for clipping in the second channels.

Since the fixing means, for example screws or nails, are inserted into the second channels, it will be apparent that there is substantially no risk of the fixing means penetrating the cables, pipes or the like in the first channels and possibly causing injury to a user of the surface ducting for example as would be the case if a screw penetrated an electrical cable. The fixing means will usually be for fixing upstanding electrical boxes to the ducting. The fixing means may also be for fixing the ducting to a desired surface.

Preferably there are three first channels although it is to be appreciated that other numbers of channels may be present in the surface ducting.

Preferably, the retainer means of the lid are a pair of beads, each bead being positioned on a support flange, and each bead extending to either side of the support flange so that each rib cooperates with opposing lugs, one lug being formed on a side wall and one lug being formed on the adjacent rib. Alternatively, the retainer means of the lid may be ribs, each rib being such that it extends outwardly and terminates in a lug part which cooperates with an inwardly projecting lug on the side wall.

Preferably, the surface ducting is such that the lid and/or the ribs of the body portion have platform members. The platform members ensure that the lid is always firmly supported on the body portion and they avoid the need for extreme precision manufacture of any ribs on the lids. The platform members on the lid may be on the ends of ribs formed on the lid, the ribs on the lid being arranged to be in line with the ribs on the body portion when the lid is in position on the body portion. By varying the height of the ribs on the body portion and/or the lid, the depth of the first channels can easily be varied to accommodate different amounts and sizes of elongate members.

In one embodiment of the invention, the retainer means and the platform means are formed together as a single member at the end of the outermost ribs on the lid.

Usually, the lid will be formed to have integrally formed flanges which overlap the side walls of the body portion and which slope downwardly towards the base of the body portion and terminate short of the base. The flanges effectively form ramps so that if the surface ducting is laid on a floor, then the ends of the flanges can be arranged to terminate in a carpet so that there is virtually no chance of a person walking on the carpet tripping over the surface ducting. If a carpet is not used and the surface ducting is positioned across a floor, then it may be advantageous to include ramp means which fit in the space defined by each flange and its associated side wall. The ramp means are obviously effective to reduce the possibility of a person walking across the floor tripping over the surface ducting.

Embodiments of the invention will now be described solely by way of example and with reference to the accompanying drawings in which:

FIGS. 1 and 2 illustrate first surface ducting in accordance with the invention;

FIGS. 3, 4 and 5 illustrate different sizes of second surface ducting in accordance with the invention;

FIG. 6 illustrates third surface ducting in accordance with the invention; and

FIG. 7 illustrates fourth surface ducting in accordance with the invention.

Referring to FIGS. 1 and 2, there is shown surface ducting 2 comprising a body portion 4 and a removable lid 6.

The body portion 4 has three first longitudinal channels 8 which are defined by longitudinally extending ribs 10. The ribs 10 are each formed with platform members 12, 14. The body portion further comprises a pair of second longitudinal channels 16 which are arranged one on each side of the first channels 8 as shown and which are each defined by a side wall 18 of the body portion 4 and one of the ribs 10. The side walls 18 are provided with inwardly projecting lugs 20.

The channels 8 are for receiving elongate members (not shown) such for example as cables, pipes and the like. As will be seen from FIGS. 1 and 2, the channels 16 are narrower than the channels 8 and they are for receiving fixing means in the form of screws (not shown) for fixing upstanding electrical boxes on the surface ducting 2. The channels 16 are so narrow that they grip the sides of the screws. Since the channels 16 are entirely separate from the channels 8 by virtue of the presence of the ribs 10, it will be apparent that there is substantially no likelihood of the fixing means penetrating an elongate member in the channels 8.

When the elongate members have been appropriately laid in the channels 8, the lid 6 can be clipped into position on the body portion and for this purpose, the lid is provided with retainer means in the form of beads 22. Each bead 22 clips underneath one of the lugs 20 and one side or lug of one of the platform members 12. It will be apparent that any upward pressure on the outer edges of the lid 6 will initially merely cause the lid 6 to be held more tightly to the body portion 4. It will be appreciated that the screws in the channels 16 will also pass through the beads 22 of the lid 6.

The lid 6 is provided with integrally formed flanges 24 which overlap the side walls 18 of the body portion 4 and which slope towards the side walls 18 the base portion 4. On a carpeted floor, the surface ducting 2 as illustrated in FIG. 1 would normally be employed and the ends of the flanges 24 would normally be in the carpet. On a non-carpeted floor and in order to avoid the possibility of persons tripping over the surface ducting, ramp means 26 as illustrated in FIG. 1 may be employed, the ramp means 26 fitting in the space defined by each flange 24 and its associated side wall 18.

Referring now to FIGS. 3, 4 and 5, similar parts as in FIGS. 1 and 2 have been given the same reference numerals and their precise construction and operation will not again be given in order to avoid undue repetition of description. In FIGS. 3 and 4 it will be seen that the lid 6 has been provided with ribs 28. The ribs 28 in FIG. 3 are shorter than the ribs 28 in FIG. 4. It will thus be seen that by altering the height of the ribs 28, the effective height of the channels 8 can be altered to accomodate various sizes and quantities of the elongate members. If the lid 6 is extruded, the ribs 28 may not always be absolutely perfectly straight. This will however not matter since the platform members 12, 14 are formed to be sufficiently wide to still support the ribs 28. As an alternative to providing the lid 6 with the ribs 28 or as an alternative to varying the height of these ribs 28, the height of the ribs 10 of the body portion 4 can be increased as illustrated in FIG. 5.

Referring now to FIG. 6, similar parts as in FIGS. 1 and 2 have been given the same reference numerals and their precise construction and operation will not again be given. In FIG. 6, the lid 6 has ben provided with a plurality of longitudinally extending plates flutes 7 which act to prevent slipping by persons treading on the lid 6 and which also provide aesthetic appeal. Two pairs of the flutes 7a are closer toether than the other flutes 7 and they are positioned over the beads 22 and therefore the channels 16. These two pairs of flutes 7a thus indicate the position of the centre of the beads 22 and the channels 16 and this is of use in positioning the fixing screws. The two pairs of flutes 7a also facilitate the centering of pilot drill bits employed for the purpose of providing pilot holes for the screws.

Referring now to FIG. 7, similar parts as in FIGS. 1 and 2 have again been given the same reference numerals and their precise construction and operation will not again be given. In FIG. 7, the lid 6 has been formed with ribs 28 which are provided with members 30. These members 30 have a platform part 32 and an integrally formed lug part 34 for engaging with the lugs 20 on the side walls 18.

The surface ducting 2 can be produced in any desired sizes and from various materials. The materials chosen will be those having good wear and impact properties and, where the surface ducting is to contain electrical cables, then the material chosen will preferably be a good electrical insulator. A presently preferred material is unplasticised polyvinyl chloride but metals may also be employed. It is preferred to extrude the surface ducting and materials that can easily be extruded will therefore normally be used.

It is to be appreciated that the embodiments of the invention described above have been given by way of example only and that modifications may be effected. Thus, for example, various types of electrical connecting boxes can be positioned on the lid 6. The body portion will usually be stuck to a surface with a suitable adhesive but screws, nails or the like may be employed if desired. The body portion 4 may be fixed to a basic structural surface which is then covered with, for example, chipboard, plasterboard or plaster. Lengths of the body portions 4 and the lids 6 can be butt joined together, for example using a non-setting mastic composition which prevents the ingress of moisture between the joints. The ramp means 26 is preferably a friction fit in position so that it can be removed in the event that a previously non-carpeted floor surface should be carpeted. However, if desired, the ramp means 26 can obviously be fixed in position, for example using adhesives.

In use of the surface ducting 2, the anticipated wear of a surrounding surface such for example as a carpet will be taken into consideration in determining the appropriate height of the surface ducting 2. If for any reason the surface ducting 2 should become too proud of the carpet or other surface, then if a lid 6 with ribs 28 has been employed, a replacement lid with shorter ribs 28 can be put onto the body portion 4.

We claim:

1. Surface ducting comprising a body portion and a removable lid, the body portion having a base, first longitudinal channels defined by longitudinally extending ribs which are upstanding from the base, and a pair of second longitudinal channels which are arranged one on each side of the first channels and which are each defined by a side wall of the body portion and one of the ribs, said side wall of the body portion being upstanding from the base and forming an outside of the second longitudinal channels, the first and second longitudinal channels being of the same height, the first channels being for receiving elongate members, the second channels being narrower than the first channels and extending the full distance from the lid to the base so as to be capable of accomodating fixing means extending from the lid to the base for fixing the lid to the base via the second longitudinal channels while not interfering with the first longitudinal channels, and the lid having integrally formed retainer means for clipping in the second longitudinal channels.

2. Surface ducting according to claim 1 in which there are three first channels.

3. Surface ducting according to claim 1 in which the retainer means of the lid are a pair of beads, each bead being positioned on a support flange, and each bead extending to either side of the support flange so that each rib cooperates with opposing lugs, one lug being formed on a side wall and one lug being formed on the adjacent rib.

4. Surface ducting according to claim 1, claim 2 or claim 3 in which the lid is formed with ribs adjacent the ribs of the body portion so that the ribs of the lid rest on top of the ribs of the body by face to face contact.

5. Surface ducting according to claim 1, claim 2 or claim 3 in which the lid is formed with ribs adjacent the ribs of the body portion, and in which the ribs of the lid have platform members for resting on the ribs of the body portion by face to face contact.

6. Surface ducting according to claim 1, claim 2 or claim 3 in which the ribs of the body portion have platform members.

7. Surface ducting according to claim 1, claim 2 or claim 3 in which the lid has integrally formed flanges which overlap the side walls of the body portion and which slope downwardly towards the base of the body portion and terminate short of the base.

8. Surface ducting according to claim 1, claim 2 or claim 3 in which the lid has integrally formed flanges which overlap the side walls of the body portion and which slope downwardly towards the base of the body portion and terminate short of the base, and in which the surface ducting includes ramp means for fitting in the space defined by each flange and its associated side wall.

9. Surface ducting according to claim 1, claim 2 or claim 3 in which the lid is formed with ribs adjacent the ribs of the body portion, in which the ribs of the body portion have platform members, in which the lid has integrally formed flanges which overlap the side walls off the body portion and which slope downwardly towards the base of the body portion and terminate short of the base, and in which the surface ducting includes ramp means for fitting in the space defined by each flange and its associated side wall.

10. Surface ducting according to claim 1, claim 2 or claim 3 in which the lid is provided with longitudinally extending flutes across its upper surface, two separate pairs of these flutes having flutes that are spaced more closely together than the remaining flutes, and the said separate pairs of flutes being positioned one each above one of the second longitudinal channels, whereby each said separate pair of flutes indicates the position of the second longitudinal channel underneath the lid and also enables centering of a pilot drill used for providing pilot holes for the fixing means.

* * * * *